United States Patent
Schröder et al.

(10) Patent No.: US 12,466,413 B2
(45) Date of Patent: Nov. 11, 2025

(54) DETECTING AND DETERMINING RELEVANT VARIABLES OF AN OBJECT BY MEANS OF ULTRASONIC SENSORS

(71) Applicant: Volkswagen Aktiengesellschaft, Wolfsburg (DE)

(72) Inventors: Marvin Schröder, Braunschweig (DE); Tatjana Kruscha, Braunschweig (DE); Fabian Galetzka, Wolfsburg (DE); Benjamin Groß, Braunschweig (DE); Jan Kempa, Wolfsburg (DE); Christoph König, Hannover (DE); Jakob Spiegelberg, Braunschweig (DE); Jan Sonnenberg, Didderse (DE); Christian Bruns, Braunschweig (DE); Bernd Lehmann, Wolfsburg (DE); Laura Fieback, Braunschweig (DE); Marius Spika, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 324 days.

(21) Appl. No.: 18/318,329

(22) Filed: May 16, 2023

(65) Prior Publication Data
US 2023/0373498 A1 Nov. 23, 2023

(30) Foreign Application Priority Data
May 20, 2022 (DE) .................. 10 2022 205 084.3

(51) Int. Cl.
*B60W 50/00* (2006.01)
(52) U.S. Cl.
CPC ... *B60W 50/0097* (2013.01); *B60W 2420/408* (2024.01); *B60W 2420/54* (2013.01)

(58) Field of Classification Search
CPC ....... B60W 50/0097; B60W 2420/408; B60W 2420/54; B60W 2556/20; B60W 60/0015;
(Continued)

(56) References Cited

U.S. PATENT DOCUMENTS 10,242,665 B1    3/2019  Abeloe
11,120,690 B2 *  9/2021  Günther .............. G08G 1/166
(Continued)

FOREIGN PATENT DOCUMENTS

DE  102019219925 A1  6/2021  .............. G06K 9/00
DE  102020202974 A1  9/2021  .............. G06K 9/80

OTHER PUBLICATIONS

German Office Action, Application No. 102022205084.3, 6 pages, Dec. 13, 2022.

*Primary Examiner* — Mussa A Shaawat
(74) *Attorney, Agent, or Firm* — Slayden Grubert Beard PLLC

(57) ABSTRACT

The present disclosure relates to a method, to a computer program comprising instructions, and to a device for environment sensing in a vehicle. For the environment sensing, environment data are recorded by means of at least one vehicle sensor. A prediction is calculated by means of a trained machine learning model based on the recorded environment data, wherein the prediction includes a measure of uncertainty for the prediction. Equally, a deviation value is determined for the recorded environment data that provides a measure of how significantly the recorded environment data deviate from training data for the machine learning model. At least one conformity score is determined based on the measure of uncertainty and the deviation value and then a prediction set is determined based on the at least one determined conformity score. Then, a control signal is generated depending on the determined prediction set.

20 Claims, 2 Drawing Sheets

(58) Field of Classification Search
CPC . B60W 50/00; B60W 2050/0043; G06N 3/02
See application file for complete search history.

(56) References Cited

U.S. PATENT DOCUMENTS

| | | | |
|---|---|---|---|
| 11,390,286 B2* | 7/2022 | Efrat Sela | G06F 18/214 |
| 12,189,387 B2* | 1/2025 | Fonseca | G05D 1/0214 |
| 2015/0112571 A1* | 4/2015 | Schmudderich | B60W 30/14 |
| | | | 701/1 |
| 2018/0089563 A1* | 3/2018 | Redding | G06N 5/01 |
| 2018/0359713 A1* | 12/2018 | Boban | H04W 64/00 |
| 2019/0043347 A1* | 2/2019 | Biehle | G08G 1/096716 |
| 2019/0222595 A1 | 7/2019 | Giani et al. | |
| 2019/0230119 A1 | 7/2019 | Mestha et al. | |
| 2019/0250628 A1* | 8/2019 | Rothhämel | G06N 3/08 |
| 2019/0260768 A1 | 8/2019 | Mestha et al. | |
| 2019/0310650 A1* | 10/2019 | Halder | G06N 3/08 |
| 2019/0339687 A1* | 11/2019 | Cella | H04B 17/309 |
| 2020/0180647 A1* | 6/2020 | Anthony | G08G 1/0125 |
| 2020/0233956 A1 | 7/2020 | Wang et al. | |
| 2020/0283014 A1* | 9/2020 | Wray | B60W 60/001 |
| 2020/0346666 A1* | 11/2020 | Wray | G05D 1/0221 |
| 2020/0356828 A1* | 11/2020 | Palanisamy | G05D 1/024 |
| 2021/0037044 A1 | 2/2021 | Achanta et al. | |
| 2021/0046954 A1* | 2/2021 | Haynes | B60W 60/00272 |
| 2021/0064040 A1* | 3/2021 | Yadmellat | G05D 1/0214 |
| 2021/0064888 A1* | 3/2021 | Hardå | B60W 30/09 |
| 2021/0268653 A1* | 9/2021 | Tian | B25J 9/1664 |
| 2021/0300433 A1 | 9/2021 | Vorobeychik et al. | |
| 2021/0380099 A1* | 12/2021 | Lee | G08G 1/0141 |
| 2022/0126864 A1* | 4/2022 | Moustafa | B60W 40/09 |
| 2022/0163966 A1* | 5/2022 | Fonseca | G05D 1/0214 |
| 2023/0391373 A1* | 12/2023 | Di Cairano | G08G 1/163 |
| 2024/0101145 A1* | 3/2024 | Rojas Quinones | G06V 10/766 |
| 2024/0425074 A1* | 12/2024 | Shahriari | B60W 40/02 |
| 2025/0042409 A1* | 2/2025 | Nacken | G06V 20/56 |

\* cited by examiner

DETECTING AND DETERMINING RELEVANT VARIABLES OF AN OBJECT BY MEANS OF ULTRASONIC SENSORS

CROSS-REFERENCE TO RELATED APPLICATIONS

This application claims priority to German Patent Application No. 10 2022 205 084.3, filed on May 20, 2022 with the German Patent and Trademark Office. The contents of the aforesaid patent application are incorporated herein for all purposes.

TECHNICAL FIELD

The present invention relates to a method, to a computer program comprising instructions, and to a device for environment sensing in a vehicle, which method can be used, in particular, to secure a sensing circuit of the vehicle. The invention also relates to a vehicle in which the method according to the invention or a device according to the invention is used.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In machine learning (ML), a statistical model is created by means of suitable self-adaptive algorithms and based on training data, by means of which statistical model patterns and laws can be recognized and predictions for future data or decisions can be made based on recorded data. One area of application of machine learning that is becoming increasingly important is use in vehicles, for example for driver assistance systems in the case of semi-automated driving or for safety systems in the case of fully automatic driving. For example, vehicle sensors can be used to record the environment of the vehicle and to create an environment model based on the recorded sensor data by means of a suitable machine learning model.

Sensing modules are provided for this purpose, by means of which learned objects can be recognized in the recorded sensor data relating to the environment. The sensing modules typically forward corresponding information to a planning module, if applicable via a fusion module, which integrates the sensing results of multiple sensing modules and/or sensors. The planning module then takes account of the recognized objects for trajectory planning and for safe control of the vehicle, wherein it is possible to decide between multiple possible maneuvers, if applicable with the aid of a decision module. This decision is then forwarded to a control module, which generates corresponding control signals for the vehicle.

Like the sensing modules, the planning module can also be based on a machine learning model. Due to the complexity, the machine learning models are typically designed as neural networks, which are implemented, for example, on a central control unit of the vehicle that comprises sufficient computing capacities for this purpose.

For autonomously driving vehicles, in particular, the reliability of the environment sensing is of high importance in order to prevent malfunctions of the vehicles and in order to ensure the safety of passengers of the vehicle or people in the environment of the vehicle. This leads to the challenge of securing the machine learning models used in the vehicle against data points that deviate significantly from the training data or rather distributions of said training data (out-of-distribution (OOD) data) or that have been manipulated by an external perturbation in order to mislead the algorithm (adversarial attacks).

Various approaches are known for this. For example, an upstream detector can be used to try to recognize such deviating OOD values. However, the definition of a threshold value for distinguishing OOD points is problematic here, for example if increasingly poor predictions gradually appear in the event of a drift of a sensor providing environment data. Equally, robustness tests are intended to provide security such that a perturbation of a particular amplitude never has a stronger empirical effect on the prediction than to a particular degree, but without providing a guarantee of this. Equally, it can be provided that systemic robustness ensures that a reliable decision is still possible even in the event of failure of an ML module in the vehicle.

Manipulation can take place, in particular, by means of perturbation of the sensors used or by means of a cyberattack via a connection to the internet.

One approach which makes it possible to assess the uncertainty of predictions generated by a machine learning model and thus to secure the machine learning model against significantly deviating data points is conformal prediction. Here, during training of the machine learning model, some of the data is retained as a calibration data set in order to then define a conformity function that incorporates the output of the trained machine learning model and in order to apply said conformity function to the calibration data set. In this way, a conformity score distribution is obtained. This can then be used to generate a confidence set or rather interval for a data point to be predicted. For this purpose, a conformity score of the data point is determined which indicates how well this data point matches the rest of the data set. A desired percentile value is defined for the true value to be within the prediction interval, for example a certainty for this of 90%, and then the conformity distribution and a statistical test are used to determine the required number of predictions, referred to in the following as prediction set, of discrete classes into which the data point can be classified in order to meet the required risk. In this way, any desired machine learning functions can be calibrated, and the uncertainty thereof can be estimated correctly, even if pessimistically.

SUMMARY

A need exists to provide an improved method and/or device for environment sensing in a vehicle that makes predictions by means of a trained machine learning model.

The need is addressed by the subject matter of the independent claims. Embodiments are described in the dependent claims, the following description, and the drawings.

DESCRIPTION

Figure 1:
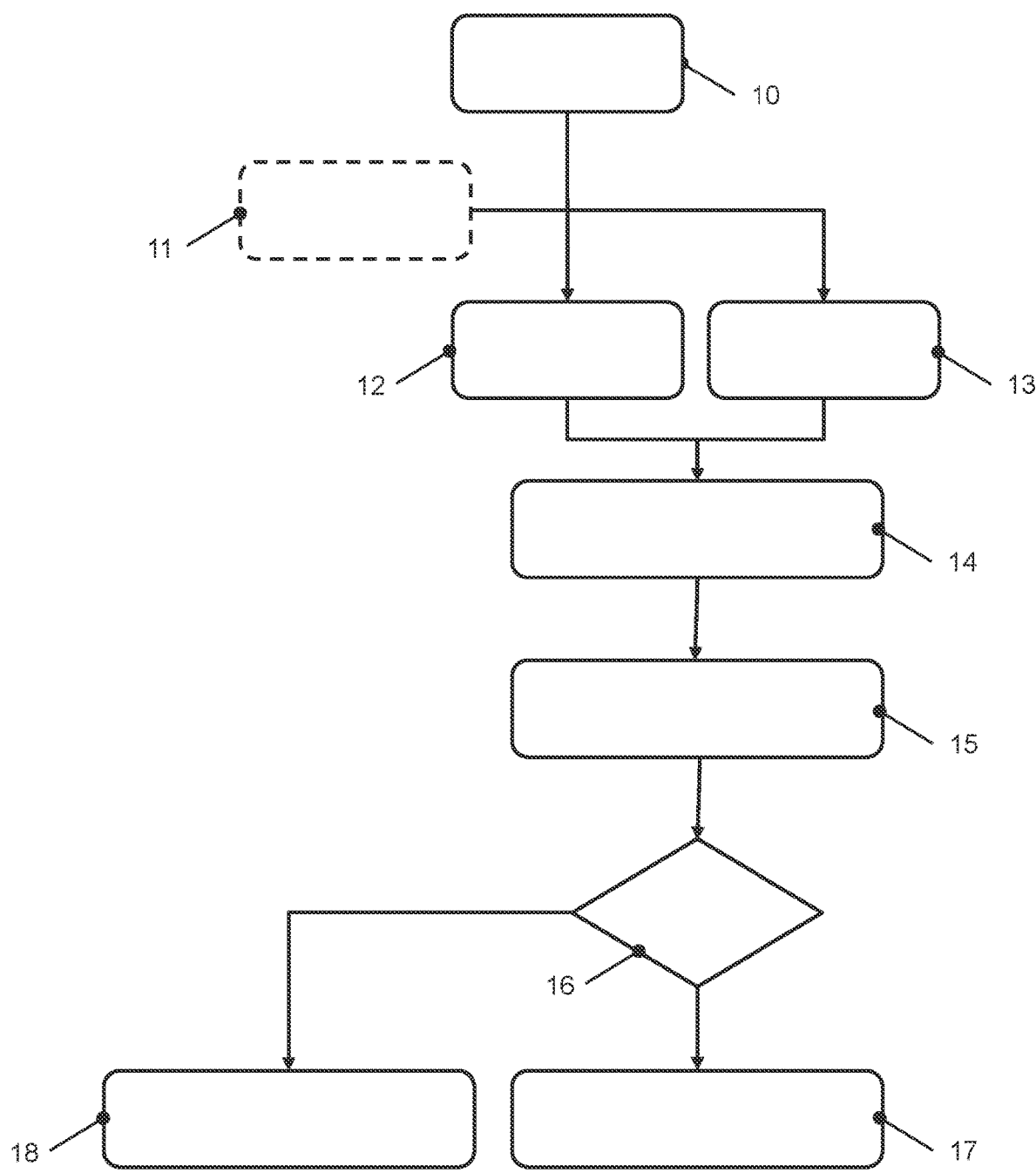
FIG. 1 schematically shows a flow diagram for an example method carried out by a sensing circuit in the vehicle.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method for environment sensing in a vehicle is provided, comprising:
  recording environment data using at least one vehicle sensor;
  calculating a prediction using a trained machine learning model based on the recorded environment data, wherein the prediction includes a measure of uncertainty for the prediction;
  determining a deviation value for the recorded environment data that provides a measure of how significantly the recorded environment data deviate from training data for the machine learning model;
  determining at least one conformity score based on the measure of uncertainty and the deviation value;
  determining a prediction set based on the at least one determined conformity score and previously determined calibration parameters; and
  generating a control signal for a vehicle function depending on the determined prediction set.

In this way, the method according to some embodiments may make it possible to generate a high uncertainty in the prediction if data points or perturbed data points that deviate significantly from the training data or rather from distributions of said training data are present, and thus to ensure security in the presence of such data points. It may therefore be provided that downstream planning and/or decision circuits do not react at all or react appropriately in such a case.

In some embodiments, after the prediction set has been determined, a distinction is made as to whether the prediction set is empty or contains at least one predictor, wherein different control signals are generated based on this.

In some embodiments, a control signal may be generated in the case that the prediction set is empty in order to initiate an emergency maneuver for the vehicle.

Furthermore, a control signal may in some embodiments be generated in the case that the prediction set comprises at least one predictor in order to prompt the vehicle to react according to the at least one predictor.

In some embodiments, a reaction takes place in such a manner permitted by the highest risk class for the predictors contained in the current prediction set.

Moreover, the at least one conformity score is in some embodiments determined based on a function that provides higher conformity scores for higher deviation values and/or higher values for the measure of uncertainty.

In some embodiments, the deviation values and the values for the measure of uncertainty are additively linked in the function.

In some embodiments, the deviation values and the values for the measure of uncertainty are multiplicatively linked in the function.

In some embodiments, the trained machine learning model is designed for environment sensing as a neural network, wherein a measure of confidence in the predictions of the neural network results from the activation function for outputting the neurons in the output layer of the neural network and wherein the measure of uncertainty results from 1−measure of confidence.

In some embodiments, the method is carried out in real time for environment sensing in a vehicle.

Furthermore, the calibration parameters may for example be determined during a calibration by means of the distribution of the conformity scores.

The disclosure also relates to a computer program comprising instructions which, when executed by a computer, cause the computer to carry out the steps of the method according to the teachings herein.

In some embodiments, a device for environment sensing in a vehicle comprises:
  a recording circuit for recording environment data by means of at least one vehicle sensor; and
  a sensing circuit that is configured to:
    calculate a prediction using a trained machine learning model based on the environment data recorded by means of the recording circuit, wherein the prediction includes a measure of uncertainty for the prediction;
    determine a deviation value for the recorded environment data that provides a measure of how significantly the recorded environment data deviate from training data for the machine learning model;
    determine at least one conformity score based on the measure of uncertainty and the deviation value;
    determine a prediction set based on the at least one determined conformity score and previously determined calibration parameters; and
    generate a control signal for a vehicle function depending on the determined prediction set.

For example, the sensing circuit is implemented on a controller (i.e., a processor) of the vehicle. In the context of the discussion herein, the terms 'processor', 'controller', and 'circuit' are understood broadly to comprise hardware and hardware/software combinations to provide the respectively discussed functionality. The respective processor', 'controller', and/or 'circuit' may be formed integrally with each other and/or with further components. For instance, the functionality of the processor', 'controller', and/or 'circuit' may be provided by a microprocessor, microcontroller, FPGA, or the like, with corresponding programming. The programming may be provided as software or firmware, stored in a memory, or may be provided by dedicated ('hard-wired') circuitry.

The teachings herein also relate to a vehicle which is configured to carry out a method according to the teachings herein or comprises a device according to the teachings herein.

In order to better understand the principles of the present disclosure, further embodiments are discussed in the following based on the FIGS. It should be understood that the invention is not limited to these embodiments and that the features described can also be combined or modified without departing from the scope of protection of the invention as defined in the claims. Specific references to components, process steps, and other elements are not intended to be limiting. Further, it is understood that like parts bear the same or similar reference numerals when referring to alternate FIGS.

A flow diagram of an embodiment of a method is shown in FIG. 1.

Here, it can be assumed that a trained high-performance ML model is already present. Different machine learning methods can be considered here, in particular neural networks.

In a method step 10, environment data are recorded by at least one vehicle sensor. This may, in particular, be image or video data of a vehicle environment recorded by one or more external cameras of the vehicle. Alternatively or additionally, the vehicle environment may also be recorded using other sensors, for example a radar sensor, a LIDAR sensor, or an ultrasonic sensor. During recording of the environment data or forwarding of the recorded environment data, manipulation may occur by means of an external perturber 11, for example by dazzling a vehicle camera using a laser pointer.

The recorded and potentially perturbed environment data are then processed as follows in the sensing circuit. Firstly, said data are supplied to a machine learning model by means of which a prediction is calculated in a method step 12 based on the recorded environment data. For example, semantic segmentation of the recorded image data can take place, wherein each pixel in the image is assigned a class in order to divide the recorded image into various segments, for example regions of the object classes "roadway", "car", "pedestrian", "road sign", "building", "tree", or "house" and, based thereon, in order to be able to recognize objects in the recorded vehicle environment and to react thereto. Equally, a trajectory for the onward journey of the vehicle or, alternatively, a driving command for the vehicle can be predicted by means of the machine learning model based on the environment data. The prediction includes a measure of uncertainty a for the prediction, referred to in the following as a naive measure of confidence, which can result from the activation function for outputting the neurons in the output layer of the neural network, for example the sigmoid or softmax function. If this is not the case, an error predictor can also be trained.

In parallel thereto, in a method step 13, deviation values are determined for the recorded environment data, which deviation values provide a measure of how significantly the recorded environment data deviate from training data for the machine learning model and, for example, can in each case be calculated as a measure of distance from a new data point to the nearest neighbor. In the following, said deviation values are also referred to as OOD values, since they are determined by means of an OOD detector.

Equally, the deviation values are determined by means of a separate ML model. For example, a separate ML model can be trained to recognize adversarial attacks and to predict an accordingly higher deviation value. Alternatively, heuristics can also be used, for example applying the ratio of high- to low-frequency components in the image, which can be used to recognize images with adversarial perturbations in an automotive context.

In a method step 14, a conformity score $\lambda_{1,2,3}, \ldots$ is then determined for each class from the naive measure of confidence of method step 12 and from the deviation value from method step 13. However, instead of simply mapping how much the model trusts the prediction of a new data point, as in conventional conformal prediction, a composite function is thus used in which a measure of the deviation is included in the conformity function. Although this contradicts a basic assumption of the known conformal prediction methods, according to which the data considered are interchangeable and therefore not "out-of-distribution", investigations of the inventors have shown that this does not apply to measures of conformity with an intrinsic OOD value.

Generally speaking, a function is selected for determining the conformity score which provides higher conformity scores for higher deviation values from method step 13 or, alternatively, lower scores for the measure of confidence from method step 12. In this way, it is ensured that, when a significantly deviating data point is recorded by the OOD detector, such an outlier leads to a higher conformity score.

In particular, a function for determining the conformity score may be as follows:

a) (1−measure of confidence [which is in [0.1], e.g., softmax])+OOD value or b) (1−measure of confidence [which is in [0.1], e.g., softmax])*OOD value [if necessary, weighting of the OOD value, e.g. by means of an exponential function].

Equally, however, other weightings of the measure of confidence are possible based on the OOD values.

In the subsequent method step 15, a prediction set with a set of predictors is then determined according to the conformity scores. Said prediction set may contain no predictors, a single predictor, or multiple predictors, depending on the selected conformity score. For example, in the case of a selected conformity score of 99%, the prediction set may be empty, i.e., contain no predictor, if the ML model is not able to classify the data point. Equally, in the event of this conformity score, the prediction set may also contain a predictor according to which the data point can be assigned to a pedestrian with a certainty of 99%. Equally, the prediction set may contain, for example, two predictors according to which the data point can be assigned to a tree or a pedestrian with a certainty of 99%.

The determination of the prediction set based on the conformity scores requires prior calibration, typically by the vehicle manufacturer, before the vehicle is shipped. Unlike in the case of conformal prediction, the deviation values are also taken into account, in addition to the measure of uncertainty of the machine learning model, for the calculation of the conformity scores as described above.

The conformity function is applied to a calibration data set in order to determine the distribution of the conformity function or rather of the parameters of the conformity function. For this purpose, some of the data from an originally available data set is retained as a calibration data set during training of the ML model. The prediction of the ML model is calibrated based on said data, wherein, as described above, conformity scores are determined by means of a suitable function, which scores indicate in each case the extent to which the prediction based on the data set can be trusted in terms of a risk-loss function, e.g. the rate of incorrect classifications for object recognition, or more complex functions such as the occurrence of dangerous driving situations. Overall, a distribution for the conformity scores is obtained, for example corresponding to a bell curve. The distribution of the conformity scores is used to determine calibration parameters by means of which the prediction set can be created such that the risk defined by the developer is not exceeded. For example, a calibration parameter for object classification may be the threshold value above which a class is added to the prediction set. For a regression, a calibration parameter may be the scaling of the uncertainty of the ML model. The calibration parameter or parameters are then saved. This makes it possible to define in advance for the later application of the sensing circuit in the inference, depending on the application, how much certainty or confidence this application requires or rather what risk is acceptable for this application, such that a prediction set is then generated in which it is guaranteed with the probability defined by the developer that the correct predictor is contained. For example, a predefined percentile of the distribution can be used for this purpose.

In this way, it can be ensured in the inference that only prediction sets that meet the defined certainty requirement are taken into account. For example, it can be defined for a particularly safety-critical application that, for correct classification of an object in the vehicle environment based on semantic segmentation of the recorded image data, a certainty of 99% should be present. During the inference, the measure of uncertainty and the deviation value are then determined in parallel for the recorded environment data and, based on this, it is checked which object classes are permitted as part of the prediction set or not, for example, whether it can be assumed with the required certainty for a data point that same corresponds either to the category "pedestrian" or to the category "tree".

By means of appropriately selected parameters, a statistically robust statement of the uncertainty with a defined risk can thus be obtained. The guarantees for the risk are potentially even overfulfilled here, i.e., uncertainties are estimated to be greater than is actually the case with a resulting lower actual risk.

If multiple different ML models are used, or if an ML model generates multiple outputs in order to accomplish multiple tasks at the same time, the above-described calibration is carried out in each case, wherein a conformity function is created in each case. For example, there may be a circuit for semantic segmentation and a model for classification. The segmentation model provides the exact outline of the objects within an image at the pixel level, unlike the classification model, in which the objects are identified. For example, a conformity function can then be created for the semantic segmentation based on the intersection-over-union (IOU) value and for the classification based on the false negative rate of the classification of the detected objects. During trajectory planning, the calibration can take place based on the mean squared error of the trajectory and/or probability of colliding with an obstacle. The resulting risk is the probability that the conformity score will be higher or lower than a threshold value. For the probability of a collision, the risk is, for example, a threshold value being exceeded.

In a method step 16, a decision is then made based on the determined prediction set as to how the vehicle should react based on the available information derived from the recorded environment data. In the embodiment shown, a distinction is made as to whether the prediction set is empty or contains at least one predictor.

If there is no predictor, the ML model cannot make a reliable prediction for the data point. Here, it can be assumed that said data point deviates significantly from the training data or has been manipulated by means of an external perturbation. In this case, in a method step 17, a control signal is generated in order to initiate an emergency maneuver for the vehicle. For example, an autonomously driving vehicle may brake and adopt a particularly cautious driving behavior until such a time as a reliable prediction can be made by means of the analysis of subsequent data points.

If, on the other hand, the prediction set contains at least one predictor, in method step 18, a control signal is generated in order to prompt the vehicle to react according to said predictors. Here, a worst-case scenario is accordingly assumed, i.e., the reaction is of the like permitted by the highest risk class for the current predictors.

If, for example, the prediction set contains the two above-mentioned predictors, according to which either a tree or a pedestrian has been recognized with 99% certainty, the reaction is as if a pedestrian had unequivocally been detected, since a higher risk class is assigned to a pedestrian than to a tree due to their mobility. The vehicle will then, unlike in the case of a tree being unequivocally recognized, select the trajectory immediately ahead and the next driving maneuver much more cautiously in order to thus ensure the safety of the pedestrian and vehicle in the event of an unforeseen movement of the pedestrian.

Equally, in the segmentation example for the case where the outline of an object is not recognized well, the reaction is as if said object had been detected with the maximum extent. If trajectory planning takes place based on the machine learning model, in which trajectory planning an obstacle is detected in the prediction interval of the trajectory, a braking and/or evasive maneuver, for example, can be initiated. If the conformity score exceeds a threshold value for an estimated probability of a collision, an emergency braking procedure, for example, can be triggered.

Most of the above-mentioned steps of the method are carried out by means of a sensing circuit in the vehicle. The method steps 12 to 16 can be executed, in particular, by a central processing unit in the vehicle, for example by means of a central control unit or a so-called vehicle server, which have a sufficient computing power even in the case of neural networks having a multitude of hidden layers between the input layer and the output layer and thus a high complexity with a very large number of parameters and computing operations. The control signals can also be generated in the method steps 17 and 18 by means of a central processing unit of this kind, but also by means of a control circuit implemented on a separate processing unit.

The method according to the present embodiments carried out in the vehicle can, for example, be carried out as a computer program on a processor, such as a central processing unit. This processor may be formed integrally with a controller of the vehicle. The computer program comprises instructions which, when executed by a processor, cause the processor to carry out the steps of the method according to the discussion herein. The processor can comprise one or more processors, for example microprocessors, digital signal processors, or a combination thereof.

Figure 2:
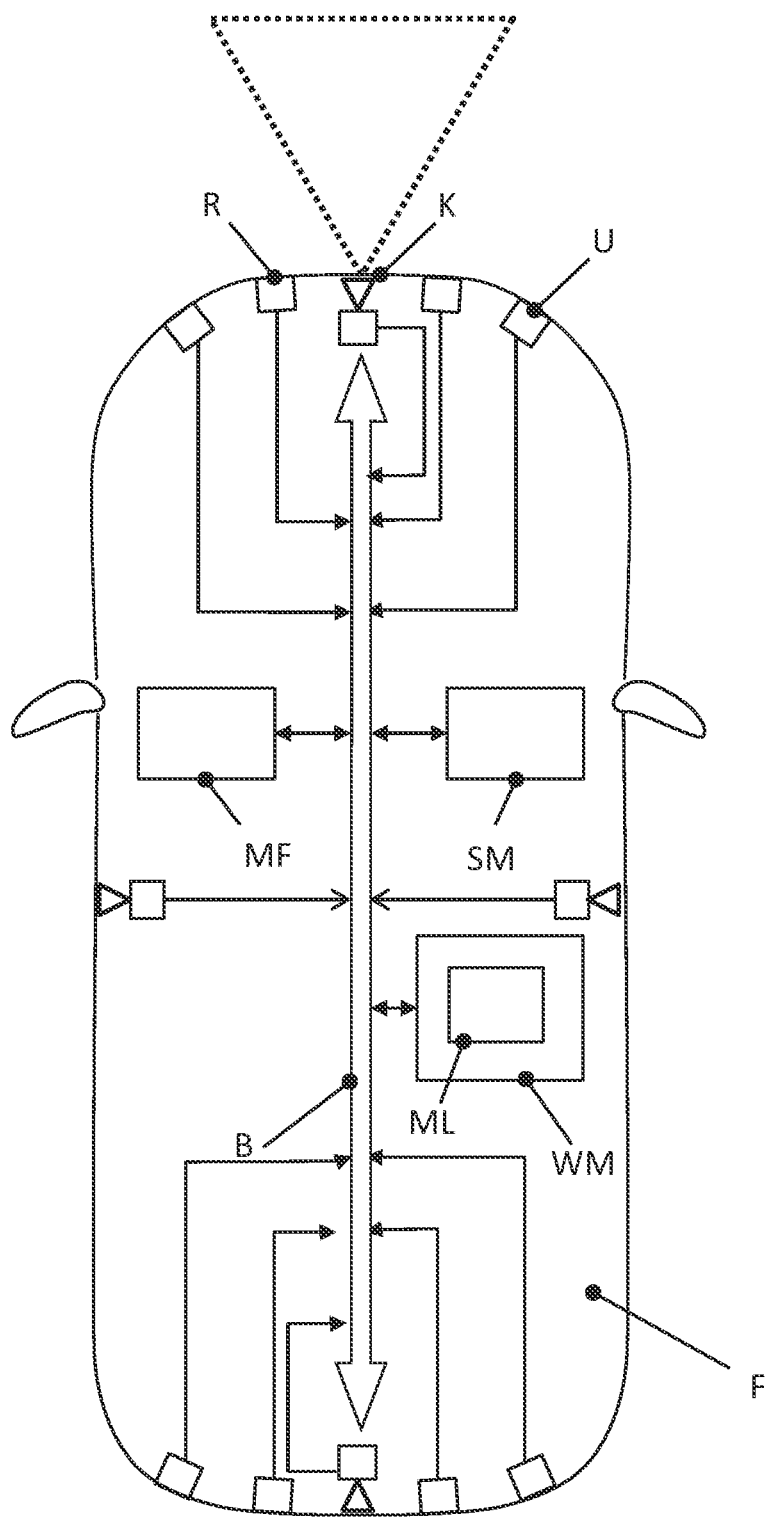
FIG. 2 shows a schematic example overview of components of a vehicle in which the method can be carried out.

FIG. 2 shows a schematic overview of components of a vehicle F in which the method according to the discussion herein can be carried out.

In the example shown, multiple cameras are provided for recording the vehicle environment, of which cameras one as the front camera K records the vehicle environment in front of the vehicle. The cameras can record light in the visible range or be designed as infrared cameras. Equally, they may also provide depth information as stereo cameras. Furthermore, in the example shown, multiple ultrasonic sensors U and radar sensors R are provided which detect the region in front of, behind and, in particular, also next to the vehicle based on the emitted ultrasonic and radar waves and on the evaluation of the echo.

The environment data recorded by means of the sensors are supplied to a sensing circuit WN via the digital data bus B, for example a CAN, MOST, FlexRay or automotive Ethernet bus in the vehicle. For example, individual video images or video sequences captured by the front camera K can be used as input data for the sensing circuit, wherein environment objects are determined in the video signals by means of a machine learning circuit ML of the sensing circuit.

However, the environment data may also be recorded using multiple cameras implemented in the vehicle. Alternatively or additionally, the vehicle environment may also be recorded using other sensors, for example one or more radar sensors, ultrasonic sensors, or LIDAR sensors (not shown in the FIG.). Equally, by means of sensor fusion, input data from sensors of different types can be used. Furthermore, the data may also include parameters that relate to the state of the relevant vehicle. The data of IMU sensors, speed sensors, sensors for operating internal combustion engines and/or electric motors, tire sensors, and/or brake-related sensors, for example, may be used for this purpose.

Furthermore, a memory (unit) SM is provided in which, for example, the recorded sensor data, parameters of the ML models, or the computer program for carrying out the method according to the teachings herein may be stored. For this purpose, the memory SM may comprise both volatile and non-volatile memory regions and be designed, for example, as a semiconductor memory. For this purpose, the computer program is transmitted to a memory of the relevant control unit during the manufacture of the central control unit and stored.

Furthermore, a mobile communication unit MF by means of which, for example, updated parameters of the ML models can be received from a central server may be provided.

LIST OF REFERENCE NUMERALS

11-18 Method steps
MF Mobile communication unit
K Camera
F Vehicle
R Radar sensor
U Ultrasonic sensor
SM Memory
WM Sensing circuit
ML Machine learning circuit
B Digital data bus The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for environment sensing in a vehicle, comprising:
    recording environment data using at least one vehicle sensor;
    calculating a prediction using a trained machine learning model based on the recorded environment data, wherein the prediction includes a naive measure of confidence, which can be based on one or more of an activation function for an outputting neurons in an output layer of a neural network, and an error predictor;
    determining a deviation value for the recorded environment data that provides a measure of how significantly the recorded environment data deviate from training data for the machine learning model;
    determining at least one conformity score based on the measure of uncertainty and the deviation value;
    determining a prediction set based on the at least one determined conformity score and previously determined calibration parameters; and
    generating a control signal for a vehicle function depending on the determined prediction set.

2. The method of claim 1, wherein, after the prediction set has been determined, a distinction is made as to whether the prediction set is empty or contains at least one predictor, wherein different control signals are generated based on the distinction.

3. The method of claim 2, wherein a control signal is generated in the case that the prediction set is empty in order to initiate an emergency maneuver for the vehicle.

4. The method of claim 2, wherein a control signal is generated in the case that the prediction set comprises at least one predictor in order to prompt the vehicle to react according to the at least one predictor.

5. The method of claim 4, wherein a reaction takes place in such a manner permitted by the highest risk class for the predictors contained in the current prediction set.

6. The method of claim 1, wherein the at least one conformity score is determined based on a function that provides higher conformity scores for higher deviation values and/or higher values for the measure of uncertainty.

7. The method of claim 6, wherein the deviation values and the values for the measure of uncertainty are additively linked in the function.

8. The method of claim 6, wherein the deviation values and the values for the measure of uncertainty are multiplicatively linked in the function.

9. The method of claim 6, wherein the trained machine learning model is configured for environment sensing as a neural network, wherein a measure of confidence in the predictions of the neural network results from the activation function for outputting the neurons in the output layer of the neural network and wherein the measure of uncertainty results from 1−measure of confidence.

10. The method of claim 1, wherein the method is carried out in real time for environment sensing in a vehicle.

11. The method of claim 1, wherein the calibration parameters are determined during a calibration by means of the distribution of the conformity scores.

12. A computer program comprising instructions which, when executed by a computer, cause the computer to:
    record environment data using at least one vehicle sensor;
    calculate a prediction using a trained machine learning model based on the recorded environment data, wherein the prediction includes a naive measure of confidence, which can be based on one or more of: an activation function for outputting neurons in an output layer of a neural network, and an error predictor;
    determine a deviation value for the recorded environment data that provides a measure of how significantly the recorded environment data deviate from training data for the machine learning model;
    determine at least one conformity score based on the measure of uncertainty and the deviation value;

determine a prediction set based on the at least one determined conformity score and previously determined calibration parameters; and generate a control signal for a vehicle function depending on the determined prediction set.

13. A device for environment sensing in a vehicle, comprising a recording circuit for recording environment data using at least one vehicle sensor; and a sensing circuit that is configured to:

calculate a prediction using a trained machine learning model based on the environment data recorded using the recording circuit, wherein the prediction includes a naive measure of confidence, which can be based on one or more of: an activation function for outputting neurons in an output layer of a neural network, and an error predictor;

determine a deviation value for the recorded environment data that provides a measure of how significantly the recorded environment data deviate from training data for the machine learning model;

determine at least one conformity score based on the measure of uncertainty and the deviation value;

determine a prediction set based on the at least one determined conformity score and previously determined calibration parameters; and generate a control signal for a vehicle function depending on the determined prediction set.

14. The device of claim 13, wherein the sensing circuit is implemented on a controller of the vehicle.

15. A vehicle which comprises the device of claim 13 or is configured to carry out the method of claim 1.

16. The method of claim 3, wherein a control signal is generated in the case that the prediction set comprises at least one predictor in order to prompt the vehicle to react according to the at least one predictor.

17. The method of claim 16, wherein a reaction takes place in such a manner permitted by the highest risk class for the predictors contained in the current prediction set.

18. The method of claim 2, wherein the at least one conformity score is determined based on a function that provides higher conformity scores for higher deviation values and/or higher values for the measure of uncertainty.

19. The method of claim 3, wherein the at least one conformity score is determined based on a function that provides higher conformity scores for higher deviation values and/or higher values for the measure of uncertainty.

20. The method of claim 4, wherein the at least one conformity score is determined based on a function that provides higher conformity scores for higher deviation values and/or higher values for the measure of uncertainty.

* * * * *